United States Patent [19]

Yamamoto

[11] Patent Number: 5,666,228

[45] Date of Patent: Sep. 9, 1997

[54] RETROFOCUS TYPE LENS

[75] Inventor: Chikara Yamamoto, Omiya, Japan

[73] Assignee: Fuji Photo Optical Co., Ltd., Omiya, Japan

[21] Appl. No.: 687,965

[22] Filed: Jul. 29, 1996

[30] Foreign Application Priority Data

Sep. 28, 1995 [JP] Japan .................... 7-274868

[51] Int. Cl.$^6$ ............. G02B 9/00; G02B 13/18; G02B 9/04
[52] U.S. Cl. ............. 359/651; 359/717; 359/793
[58] Field of Search ............. 359/649, 651, 359/793, 691, 717

[56] References Cited

U.S. PATENT DOCUMENTS

| | | | |
|---|---|---|---|
| 5,311,363 | 5/1994 | Ono et al. | 359/753 |
| 5,319,495 | 6/1994 | Yamada | 359/691 |

*Primary Examiner*—Georgia Y. Epps
*Assistant Examiner*—John P. Cornely
*Attorney, Agent, or Firm*—Ronald R. Snider

[57] ABSTRACT

In a negative first lens group composed of four sheets of lenses and a positive second lens group composed of four sheets of lenses, the lens in each lens group placed closest to the enlargement side is formed as a plastic lens having an aspheric surface, while predetermined conditional expressions are satisfied, whereby various kinds of aberration are made favorable and influence of changes in the plastic lens upon temperature is suppressed. A first lens group comprising a negative first lens (L1) made of a plastic lens having an aspheric surface, a negative second lens (L2), a negative third lens (L3), and a positive fourth lens (L4) and a second lens group comprising, a positive fifth lens (L5) made of a plastic lens having an aspheric surface, a negative sixth lens (L6), a positive seventh lens (L7), and a positive eighth lens (L8) are successively disposed from the enlargement side, while satisfying the following conditional expressions:

$-2.5 < F_1/F_5 < -0.3, -2.8 < FG_1/FG_2 < -1.0, 0.2 < H/FG_2 < 0.75,$
$0.0 < A(1), 0.0 < A(2), v_4 < 32, 58 < v_7$

2 Claims, 14 Drawing Sheets

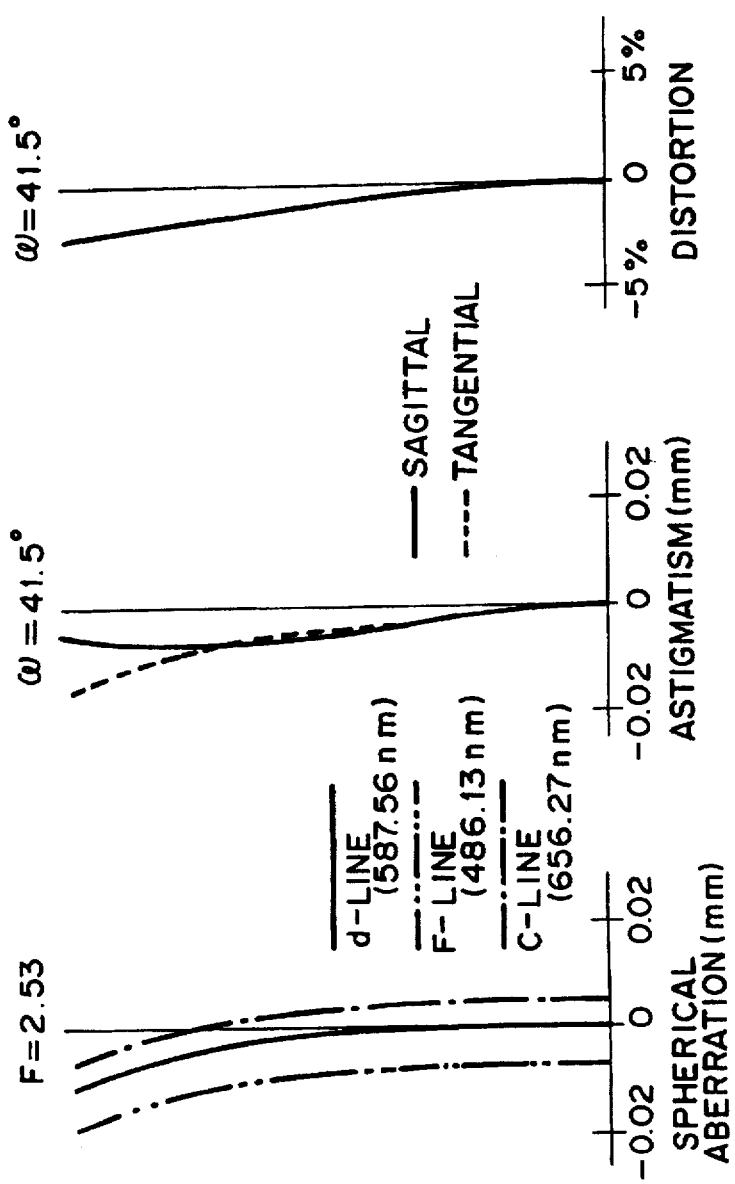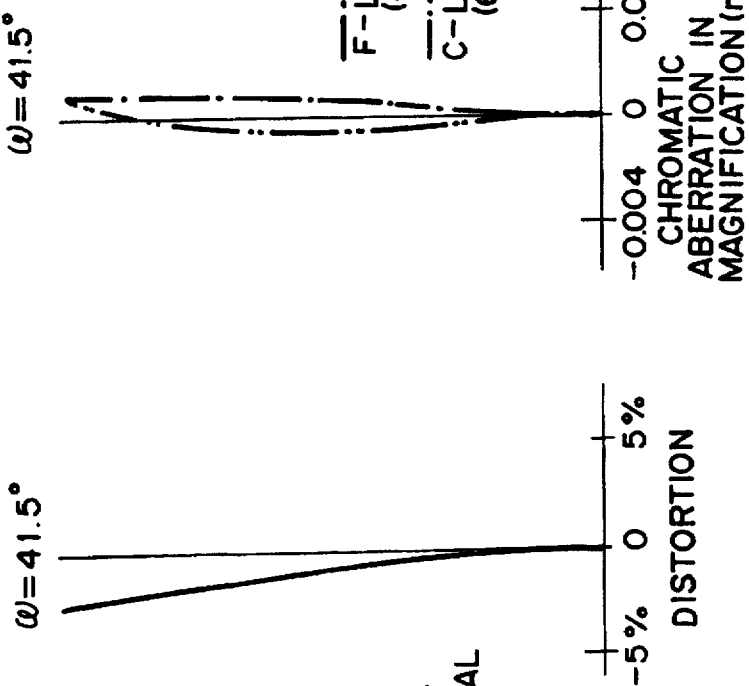

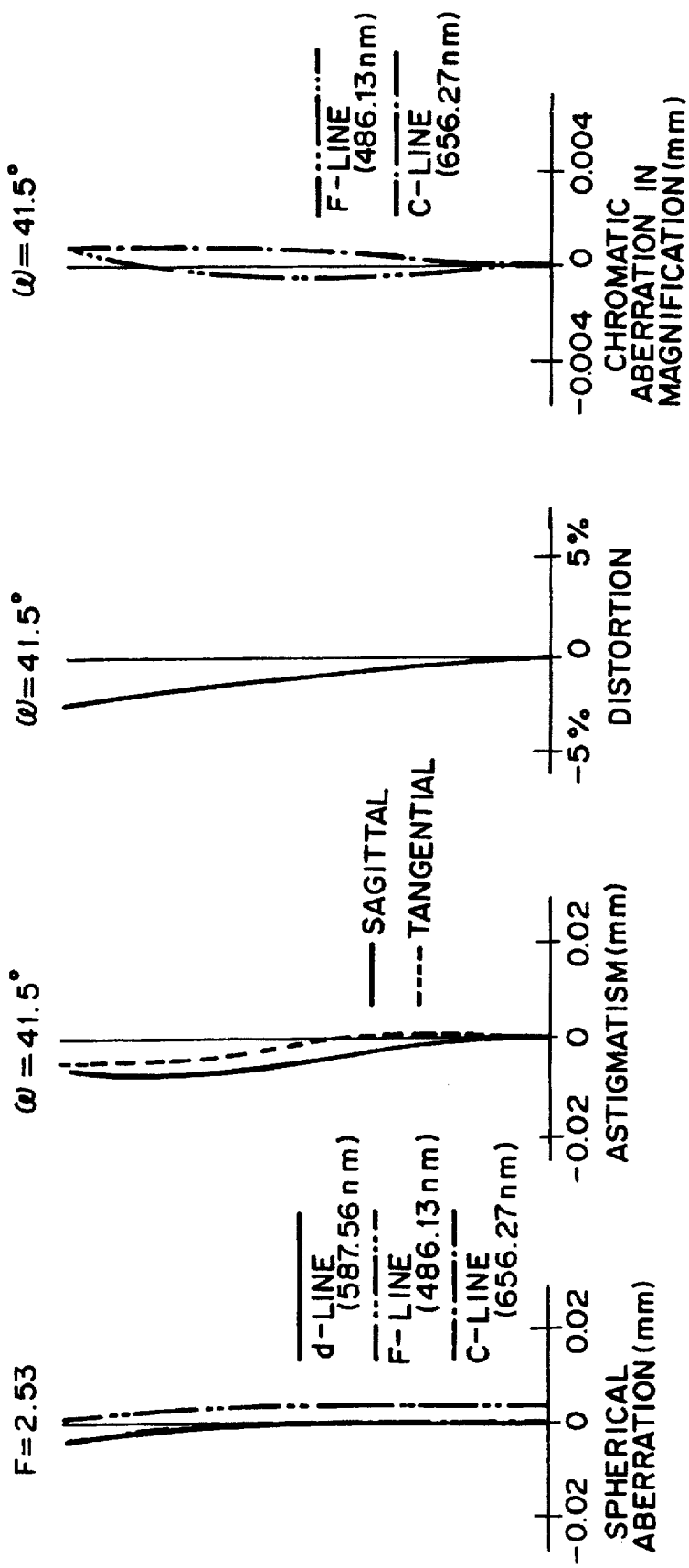

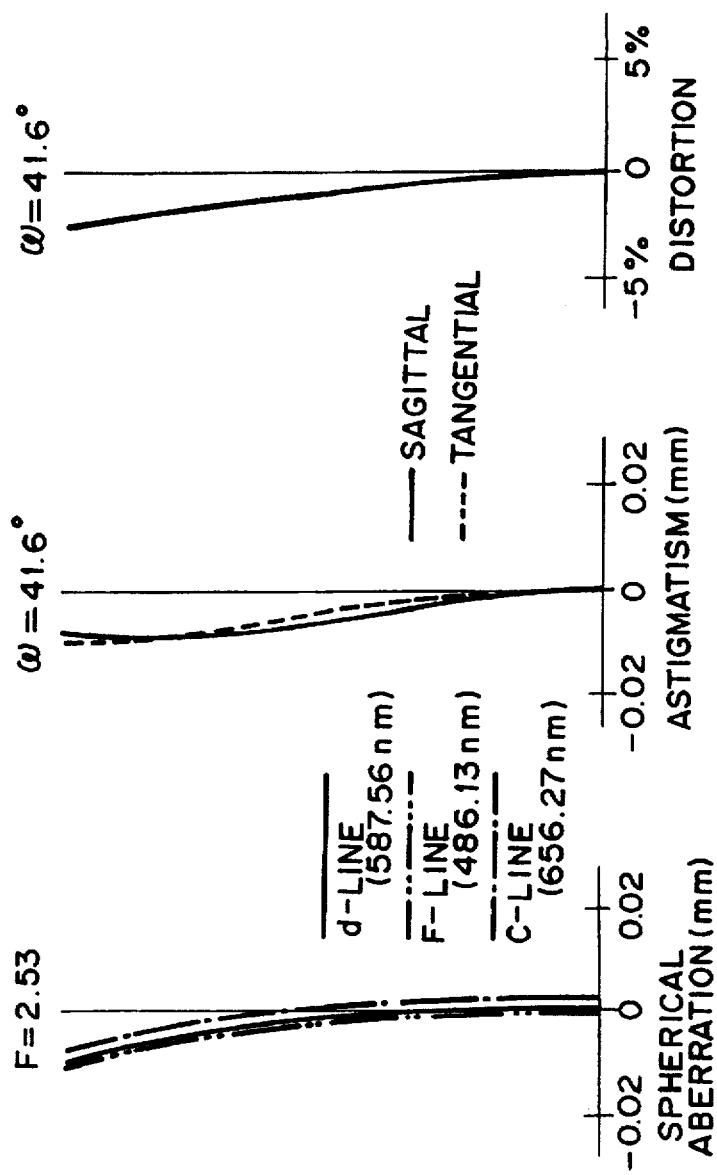

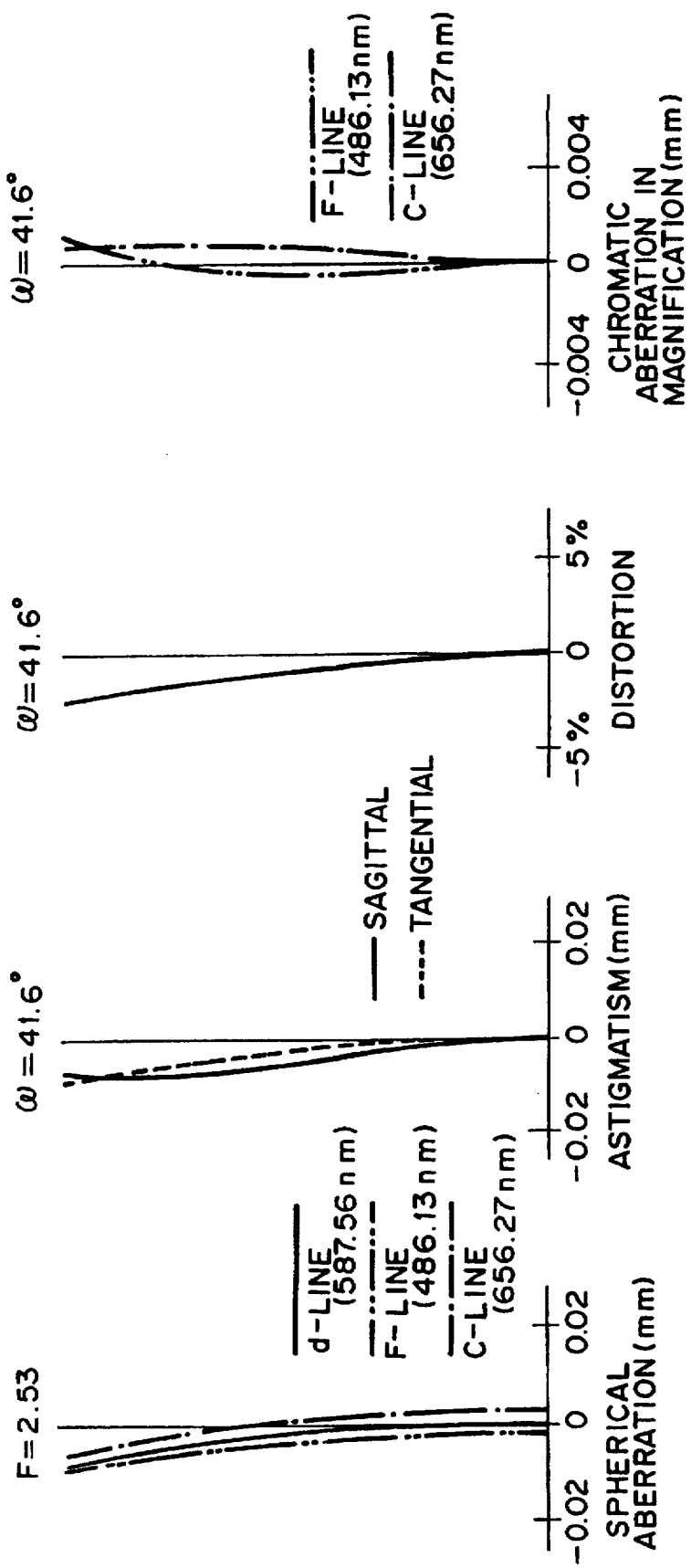

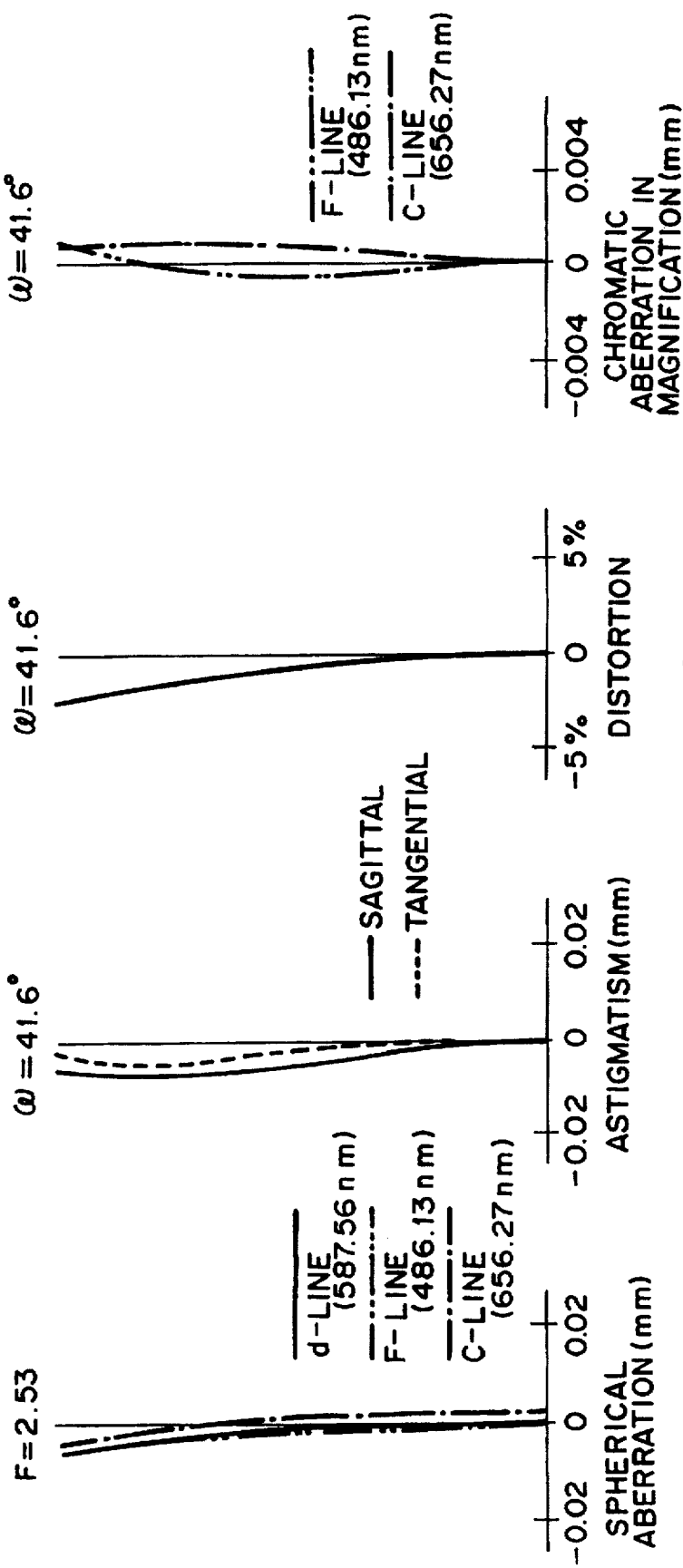

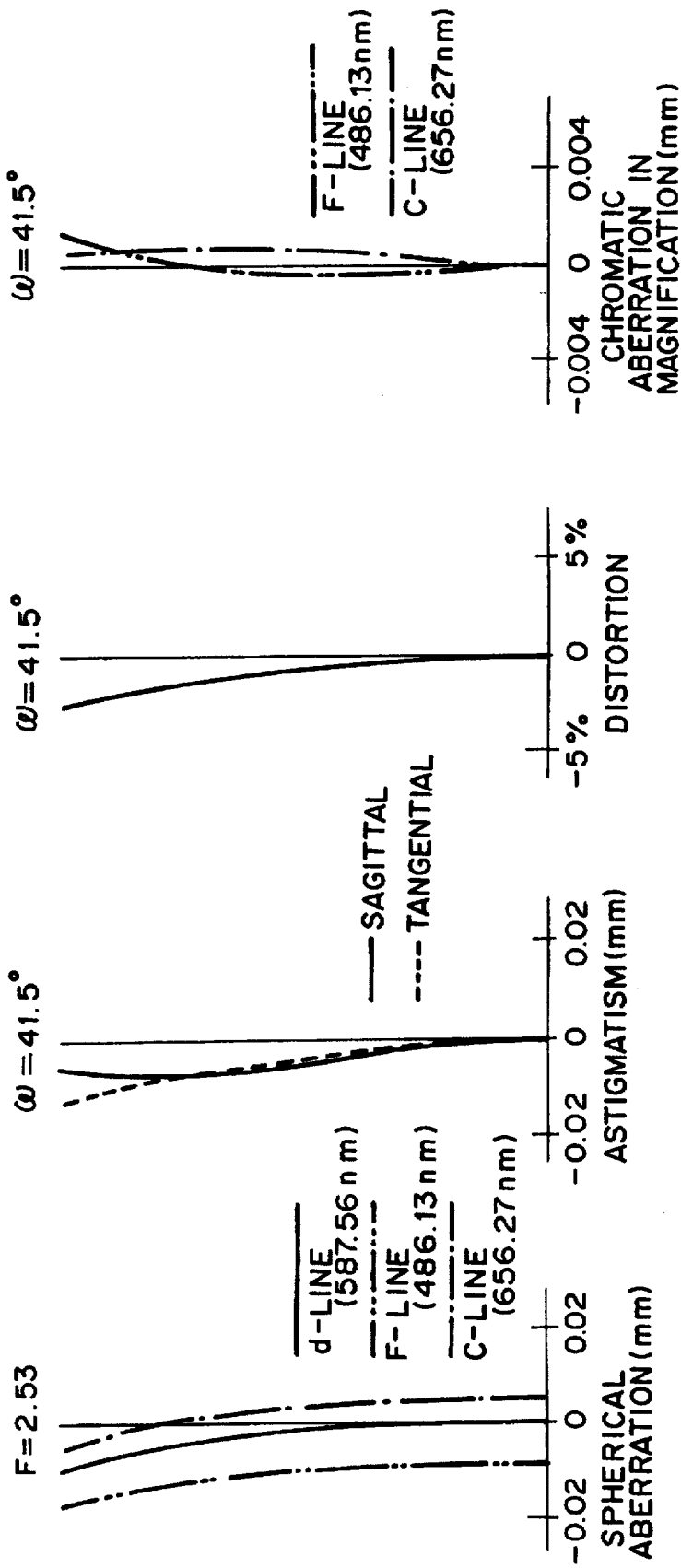

RETROFOCUS TYPE LENS

RELATED APPLICATIONS

This application claims the priority of Japanese Patent Application No. 7-274868 filed on Sep. 28, 1995, which is incorporated herein by reference.

BACKGROUND OF THE INVENTION

1. Field of the Invention

The present invention relates to a retrofocus type lens used for imaging lenses of cameras employing imaging devices such as CCD and image pickup tubes, silver halide film, or the like and for projection lenses for projector type televisions in general and, in particular, to a retrofocus type lens suitable for a projection lens of a projector type television employing a liquid crystal display panel.

2. Description of the Prior Art

When a long back focus is needed with a wide angle, there has conventionally been used a retrofocus type lens composed of a from group having a negative refractive power and a rear group having a positive refractive power. In such a retrofocus type lens, since distortion becomes greater as a wider angle is to be attained, an aspheric surface is used as a lens on the enlargement side so as to correct aberration.

Here, since the aspherical lens made of glass is more expensive, a plastic aspherical lens has been used in order to lower the manufacturing cost.

Plastic lenses, however, may be problematic in that, due to changes in temperature, their focal position tends to change greatly and their imaging property tends to deteriorate greatly. Also, materials usable for plastic lenses are more restricted than those of glass lenses in terms of refractive index and dispersion, they may be problematic in that it becomes further difficult to correct chromatic aberration in magnification which is hard to correct in a wide angle lens.

SUMMARY OF THE INVENTION

In view of such a circumstance, an object of the present invention is to provide a retrofocus type lens using an aspherical lens made of a plastic, which can eliminate influence caused by change in the plastic lens upon temperature, while correcting various kinds of aberration such as distortion.

Another object of the present invention is to provide a retrofocus type lens which can overcome a problem of decrease in the peripheral light quantity in a projection lens used in a projector type television employing a liquid crystal panel or the like, in particular.

The first retrofocus type lens of the present invention comprises, successively from the enlargement side, a first lens group which is negative as a whole and a second lens group which is positive as a whole. The first lens group comprises, successively from the enlargement side, a negative first lens made of a plastic having a concave surface directed onto the reduction side and an aspheric surface, a negative second lens having a concave surface directed onto the reduction side, a negative thkd lens, and a positive fourth lens. The second lens group comprises, successively from the enlargement side, a positive fifth lens made of a plastic having a convex surface directed onto the reduction side and an aspheric surface, a negative sixth lens, a positive seventh lens having a convex surface directed onto the reduction side, and a positive eighth lens having a convex surface directed onto the reduction side. This retrofocus type lens is configured so as to satisfy the following conditional expressions (1) to (7):

$$-2.5 < F_1/F_5 < -0.3 \tag{1}$$

$$-2.8 < FG_1/FG_2 < -1.0 \tag{2}$$

$$0.2 < H/FG_2 < 0.75 \tag{3}$$

$$0.0 < A(1) \tag{4}$$

$$0.0 < A(2) \tag{5}$$

$$v_4 < 32 \tag{6}$$

$$58 < v_7 \tag{7}$$

wherein:

$F_1$ is the focal length of the first lens, $F_5$ is is the focal length of the fifth lens, $FG_1$ is the focal length of the first lens group, $FG_2$ is the focal length of the second lens group, H is the principal point length of the second lens group on the enlargement side, A(1) is the aspheric surface coefficient of the fourth order term for the surface of the first lens on the enlargement side, A(2) is the aspheric surface coefficient of the fourth order term for the surface of the first lens on the reduction side, $v_4$ is the Abbe number of the fourth lens, and $v_7$ is the Abbe number of the seventh lens.

The second retrofocus type lens of the present invention comprises, successively from the enlargement side, a first lens group which is negative as a whole and a second lens group which is positive as a whole. The first lens group comprises, successively from the enlargement side, a negative first lens made of a plastic having a concave surface directed onto the reduction side and an aspheric surface, a negative second lens having a concave surface directed onto the reduction side, a positive third lens, and a negative fourth lens. The second lens group comprises, successively from the enlargement side, a positive fifth lens made of a plastic having a convex surface directed onto the reduction side and an aspheric surface, a negative sixth lens, a positive seventh lens having a convex surface directed onto the reduction side, and a positive eighth lens having a convex surface directed onto the reduction side. This retrofocus type lens is configured so as to satisfy the following conditional expressions (8) to (14):

$$-2.5 < F_1/F_5 < -0.3 \tag{8}$$

$$-2.8 < FG_1/FG_2 < -1.0 \tag{9}$$

$$0.2 < H/FG_2 < 0.75 \tag{10}$$

$$0.0 < A(1) \tag{11}$$

$$0.0 < A(2) \tag{12}$$

$$28 < v_4 < 55 \tag{13}$$

$$58 < v_7 \tag{14}$$

wherein:

$F_1$ is the focal length of the first lens, $F_5$ is the focal length of the fifth lens, $FG_1$ is the focal length of the first lens group, $FG_2$ is the focal length of the second lens group, H is the principal point length of the second lens group on the enlargement side, A(1) is the aspheric surface coefficient of the fourth order term for the surface of the first lens on the enlargement side, A(2) is the aspheric surface coefficient of the fourth order term for the surface of the first lens on the reduction side, $v_4$ is the Abbe number of the fourth lens, and $v_7$ is the Abbe number of the seventh lens.

BRIEF DESCRIPTION OF THE DRAWINGS

FIG. 8A shows a spherical aberration chart of the lens in accordance with embodiment 1.

FIG. 8B shows an astigmatism abberation chart of the lens in accordance with embodiment 1.

FIG. 8C shows a abberation chart of the lens in accordance with embodiment 1.

FIG. 8D shows a chromatic abberation in magnification chart of the lens in accordance with embodiment 1.

FIG. 9A shows a spherical aberration chart of the lens in accordance with embodiment 2.

FIG. 9B shows an astigmatism abberation chart of the lens in accordance with embodiment 2.

FIG. 9C shows a abberation chart of the lens in accordance with embodiment 2.

FIG. 9D shows a chromatic abberation in magnification chart of the lens in accordance with embodiment 2.

FIG. 10A shows a spherical aberration chart of the lens in accordance with embodiment 3.

FIG. 10B shows an astigmatism abberation chart of the lens in accordance with embodiment 3.

FIG. 10C shows a abberation chart of the lens in accordance with embodiment 3.

FIG. 10D shows a chromatic abberation in magnification chart of the lens in accordance with embodiment 3.

FIG. 12A shows a spherical aberration chart of the lens in accordance with embodiment 5.

FIG. 12B shows an astigmatism abberation chart of the lens in accordance with embodiment 5.

FIG. 12C shows a abberation chart of the lens in accordance with embodiment 5.

FIG. 12D shows a chromatic abberation in magnification chart of the lens in accordance with embodiment 5.

FIG. 13A shows a spherical aberration chart of the lens in accordance with embodiment 6.

FIG. 13B shows an astigmatism abberation chart of the lens in accordance with embodiment 6.

FIG. 13C shows a abberation chart of the lens in accordance with embodiment 6.

FIG. 13D shows a chromatic abberation in magnification chart of the lens in accordance with embodiment 6.

FIG. 14A shows a spherical aberration chart of the lens in accordance with embodiment 7.

FIG. 14B shows an astigmatism abberation chart of the lens in accordance with embodiment 7.

FIG. 14C shows a abberation chart of the lens in accordance with embodiment 7.

FIG. 14D shows a chromatic abberation in magnification chart of the lens in accordance with embodiment 7.

DETAILED DESCRIPTION OF THE PREFERRED EMBODIMENTS

In the following, embodiments of the present invention will be explained with reference to drawings. While seven embodiments are specifically explained in the following, elements identical to each other will be referred to with marks identical to each other in the explanation of drawings respectively corresponding to the embodiments, without their overlapping explanations being repeated.

Embodiment 1

Figure 1:
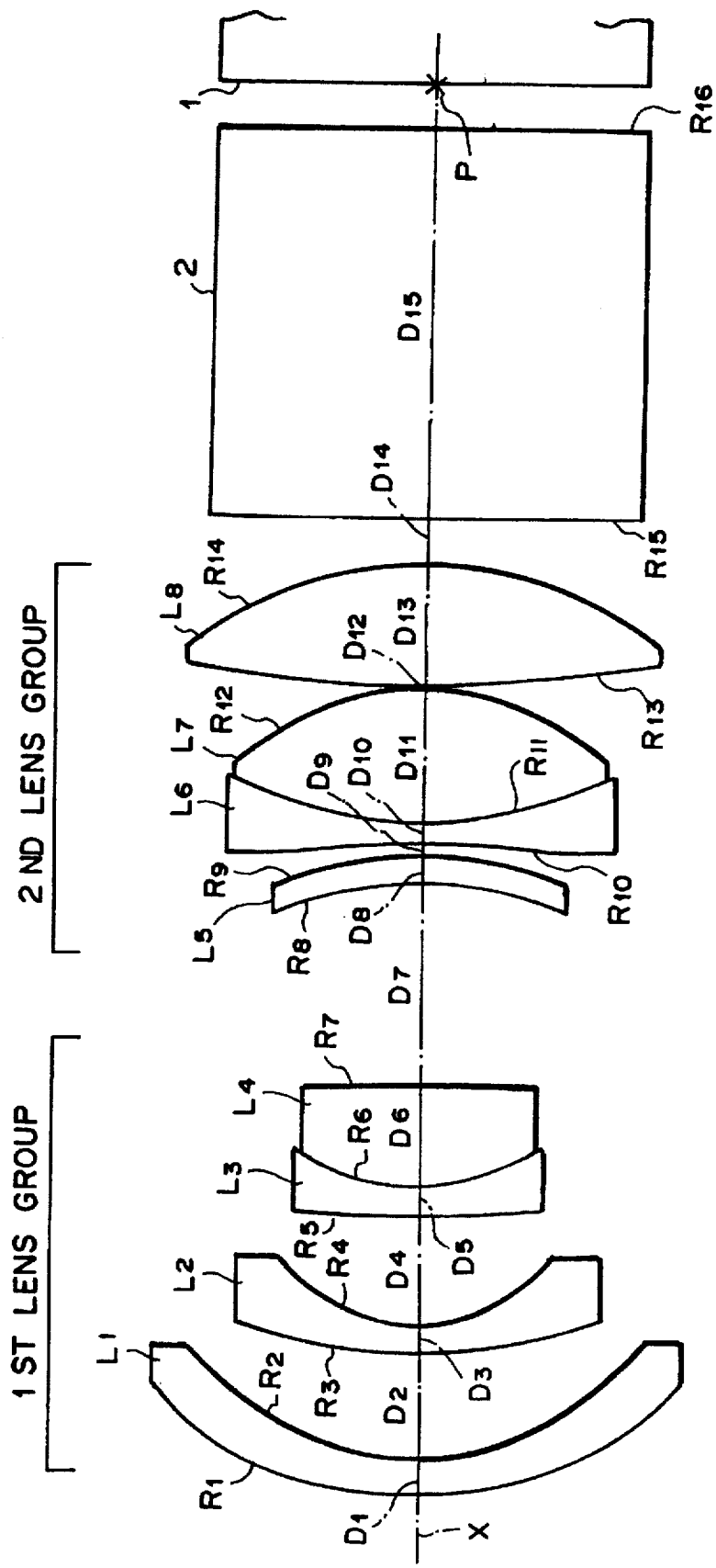
FIG. 1 a schematic view showing a basic lens configuration in accordance with Embodiment 1 of the present invention.

The retrofocus type lens of this embodiment comprises, successively from the enlargement side as shown in FIG. 1, a first lens group in which, successively from the enlargement side, a negative first lens $L_1$, a negative second lens $L_2$, a negative third lens $L_3$, and a positive fourth lens $L_4$ are disposed and a second lens group in which, successively from the enlargement side, a positive fifth lens $L_5$, a negative sixth lens $L_6$, a positive seventh lens $L_7$, and a positive eighth lens $L_8$ are disposed;

while being configured so as to satisfy the following conditional expressions (1) to (7):

$$-2.5 < F_1/F_5 < -0.3 \qquad (1)$$

$$-2.8 < FG_1/FG_2 < -1.0 \qquad (2)$$

$$0.2 < H/FG_2 < 0.75 \qquad (3)$$

$$0.0 < A(1) \qquad (4)$$

$$0.0 < A(2) \qquad (5)$$

$$v_4 < 32 \qquad (6)$$

$$58 < v_7 \qquad (7)$$

wherein:

$F_1$ is the focal length of the first lens, $F_5$ is the focal length of the fifth lens, $FG_1$ is the focal length of the first lens group, $FG_2$ is the focal length of the second lens group, H is the principal point length of the second lens group on the enlargement side, A(1) is the aspheric surface coefficient of the fourth order term for the surface of the first lens on the enlargement side, A(2) is the aspheric surface coefficient of the fourth order term for the surface of the first lens on the reduction side, $v_4$ is the Abbe number of the fourth lens, and $v_7$ is the Abbe number of the seventh lens.

Here, the third lens $L_3$ and the fourth lens $L_4$ are cemented together, while the sixth lens $L_6$ and the seventh lens $L_7$ are cemented together.

Here, a luminous flux incident on the retrofocus type lens along an optical axis X from the enlargement side forms an image at an imaging position P on a CCD imaging surface 1. Also, on the reduction side (imaging surface side) of the lens system, a color separation prism, a filter for cutting off infrared light, or a low-pass filter 2 is disposed.

Here, the first lens $L_1$ is a negative meniscus lens made of a plastic having a concave surface directed onto the reduction side and an aspheric surface, each of the second lens $L_2$ and the third lens $L_3$ is a negative meniscus lens having a concave surface directed onto the reduction side, the fourth lens $L_4$ is a biconvex lens whose surface with a stronger curvature is directed onto the enlargement side, the fifth lens $L_5$ is a positive meniscus lens made of a plastic having a convex surface directed onto the reduction side and an aspheric surface, the sixth lens $L_6$ is a biconcave lens whose surface with a stronger curvature is directed onto the reduction side, and each of the seventh lens $L_7$ and the eighth lens $L_8$ is a biconvex lens whose surface with a stronger curvature is directed onto the reduction side.

In the following, the above-mentioned conditional expressions (1) to (7) will be explained.

Beyond the upper limit or below the lower limit of conditional expression (1), the two plastic lenses of the first lens $L_1$ and the fifth lens $L_5$ lose their balance in power, thereby increasing change in focal position and deterioration in imaging property due to changes in temperature.

Beyond the upper limit of conditional expression (2), the power of the first lens group increases so much that the ray height in the second lens group becomes too much, thereby making it difficult to correct aberration. Below the lower limit, on the other hand, the power of the first lens group is so weak that the distance from the lens surface on the reduction side to the reduction-side focal position may become short or the diameter of the lens on the enlargement side in the first lens group may become large.

Conditional expression (3) keeps the reduction side of the system a telecentric configuration, while correcting various kinds of aberration. Beyond the upper limit or below the lower limit thereof, it becomes difficult to correct aberration.

Below the lower limits of conditional expressions (4) and (5), it becomes difficult to correct distortion.

Beyond the upper limit of conditional expression (6), it becomes difficult to correct chromatic aberration in magnification and axial chromatic aberration with a favorable balance therebetween.

Below the lower limit of conditional expression (7), correction of chromatic aberration in magnification becomes insufficient.

Table 1 (follows) shows radius of curvature R (mm) of each lens surface, center thickness of each lens and air gap between neighboring lenses D (mm), and refractive index N and Abbe number $v$ of each lens at d-line in this embodiment.

Here, the numbers designating marks R, D, N, and $v$ in Table 1 as well as in Tables 2 to 7, which will be shown later, successively increase from the enlargement side. Also, each of $R_1$, $R_2$, $R_8$, and $R_9$ is an aspheric surface and refers to an aspherical form computed by the following expression (A), while their radii of curvature on the optical axis are values indicated by Table 1. (These also apply to Tables 2 to 7 shown later.)

$$Z=C_R Y^2/\{1+(1-KC_R^2 Y^2)^{1/2}\}+AY^4+BY^6+CY^8+DY^{10} \quad (A)$$

wherein:

Z is the length (mm) of a perpendicular drawn from a point on the aspheric surface having a height Y from the optical axis to a tangential plane (plane perpendicular to the optical axis) of the apex of the aspheric surface;

$C_R$ is the paraxial curvature of the aspheric surface (inverse number of the radius of curvature [Ri] on the optical axis);

Y is the height (mm) from the optical axis;

K is the eccentricity; and

A, B, C, and D are aspherical coefficients of the fourth, sixth, eighth, and tenth orders, respectively.

The lower part of Table 1 shows the aspherical coefficients A, B, C, and D and eccentricity K of each of the first, second, eighth, and ninth surfaces.

The F number and half field angle ω of the lens in this embodiment are 2.53 and 41.5°, respectively.

Embodiment 2

Figure 2:
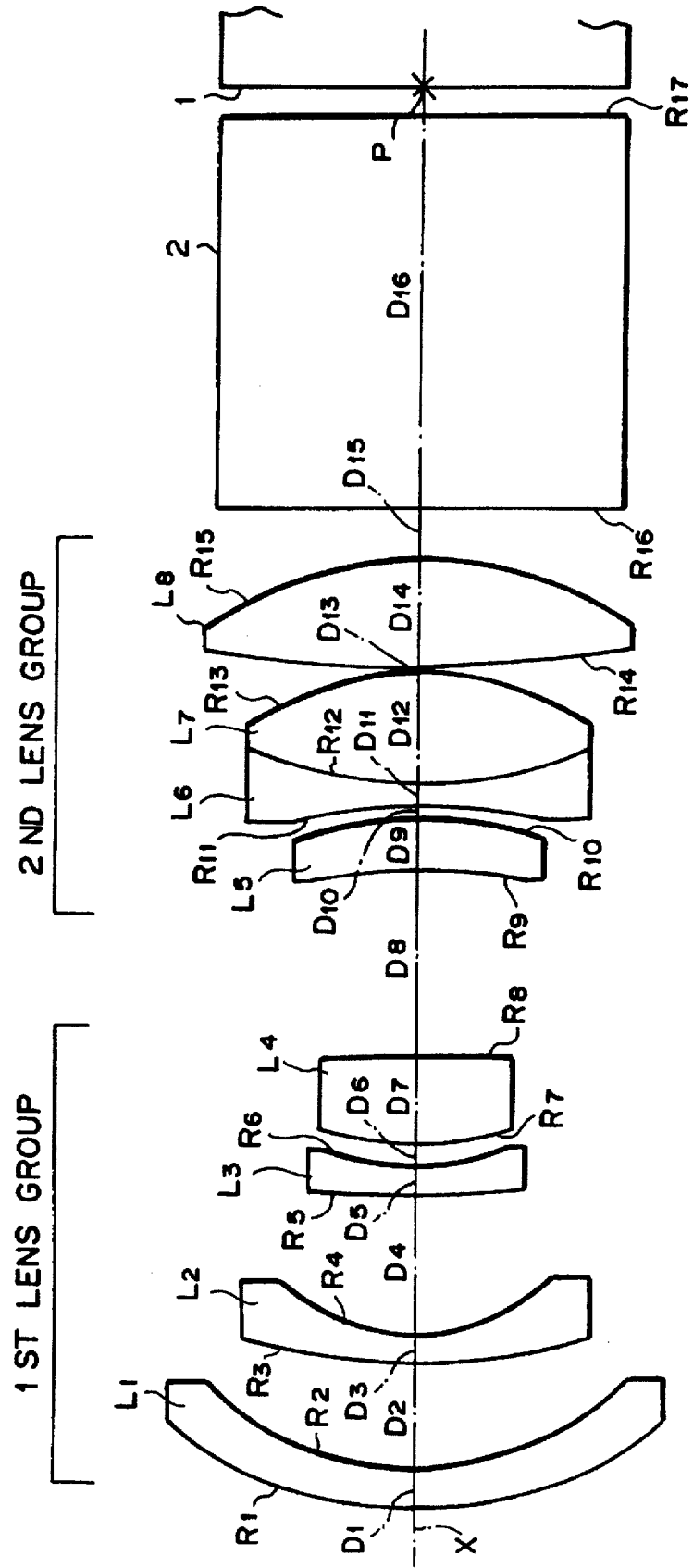
FIG. 2 is a schematic view showing a basic lens configuration in accordance with Embodiment 2 of the present invention.

The retrofocus lens of Embodiment 2 will be explained with reference to FIG. 2.

The lens of this embodiment has a lens configuration which is substantially the same as that of the lens of the above-mentioned Embodiment 1 but mainly differs therefrom in that the third lens $L_3$ and the fourth lens $L_4$ are separated from each other.

Here, all the above-mentioned conditional expressions (1) to (7) are satisfied, while individual values are set as shown in Table 8.

Table 2 (follows) shows radius of curvature R (mm) of each lens surface, center thickness of each lens and air gap between neighboring lenses D (mm), and refractive index N and Abbe number $v$ of each lens at d-line in this embodiment. The lower part of Table 2 shows the aspherical coefficients A, B, C, and D and eccentricity K of each of the first, second, eighth, and ninth surfaces.

The F number and half field angle ω of the lens in this embodiment are 2.53 and 41.5°, respectively.

Embodiment 3

Figure 3:
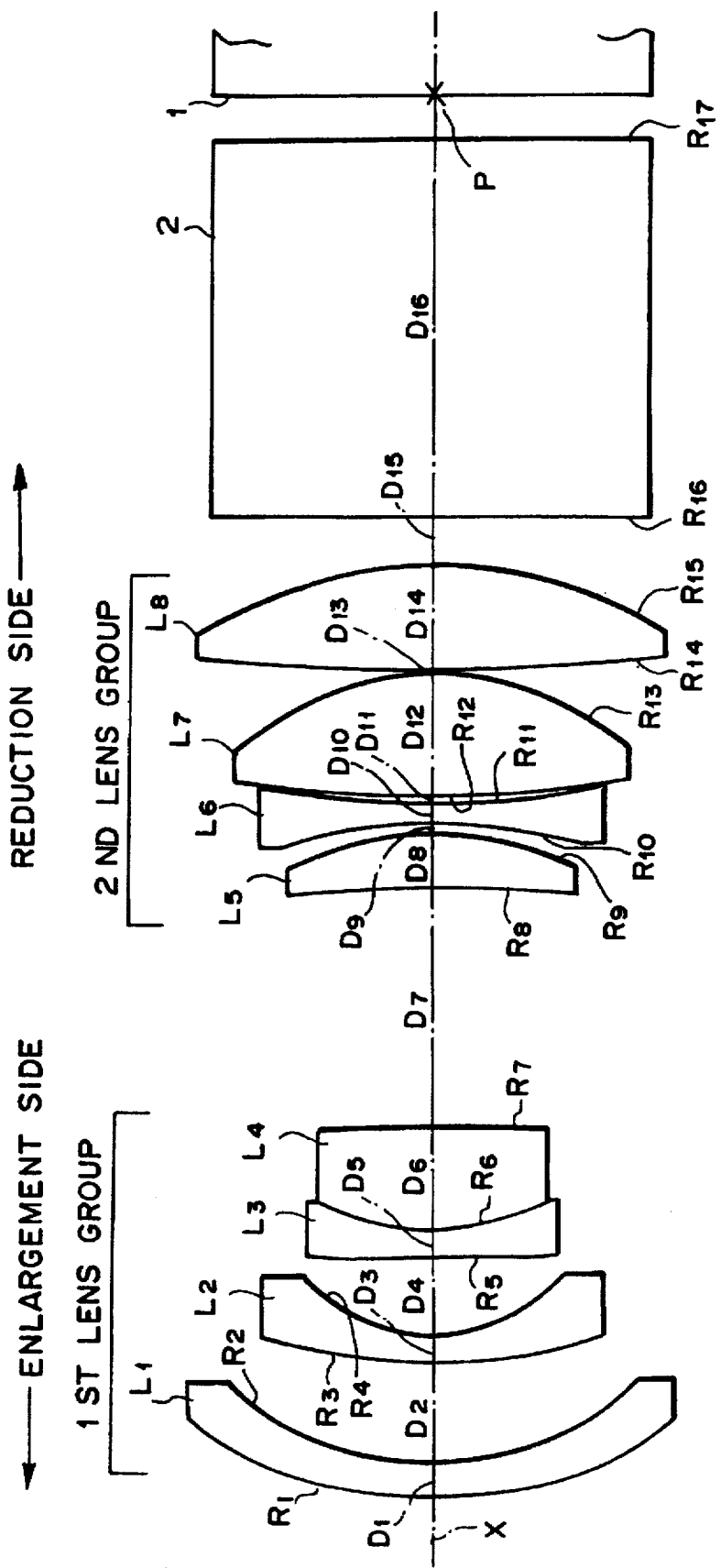
FIG. 3 is a schematic view showing a basic lens configuration in accordance with Embodiment 3 of the present invention.

The retrofocus lens of Embodiment 3 will be explained with reference to FIG. 3.

The lens of this embodiment has a lens configuration which is substantially the same as that of the lens of the above-mentioned Embodiment 1 but mainly differs therefrom in that the sixth lens $L_6$ and the seventh lens $L_7$ are separated from each other and that the sixth lens $L_6$ is a biconcave lens whose surface with a stronger curvature is directed onto the enlargement side.

Here, all the above-mentioned conditional expressions (1) to (7) are satisfied, while individual values are set as shown in Table 8.

Table 3 (follows) shows radius of curvature R (mm) of each lens surface, center thickness of each lens and air gap between neighboring lenses D (mm), and refractive index N and Abbe number ν of each lens at d-line in this embodiment. The lower part of Table 3 shows the aspherical coefficients A, B, C, and D and eccentricity K of each of the first, second, eighth, and ninth surfaces.

The F number and half field angle ω of the lens in this embodiment are 2.53 and 41.6°, respectively.

Embodiment 4

Figure 4:
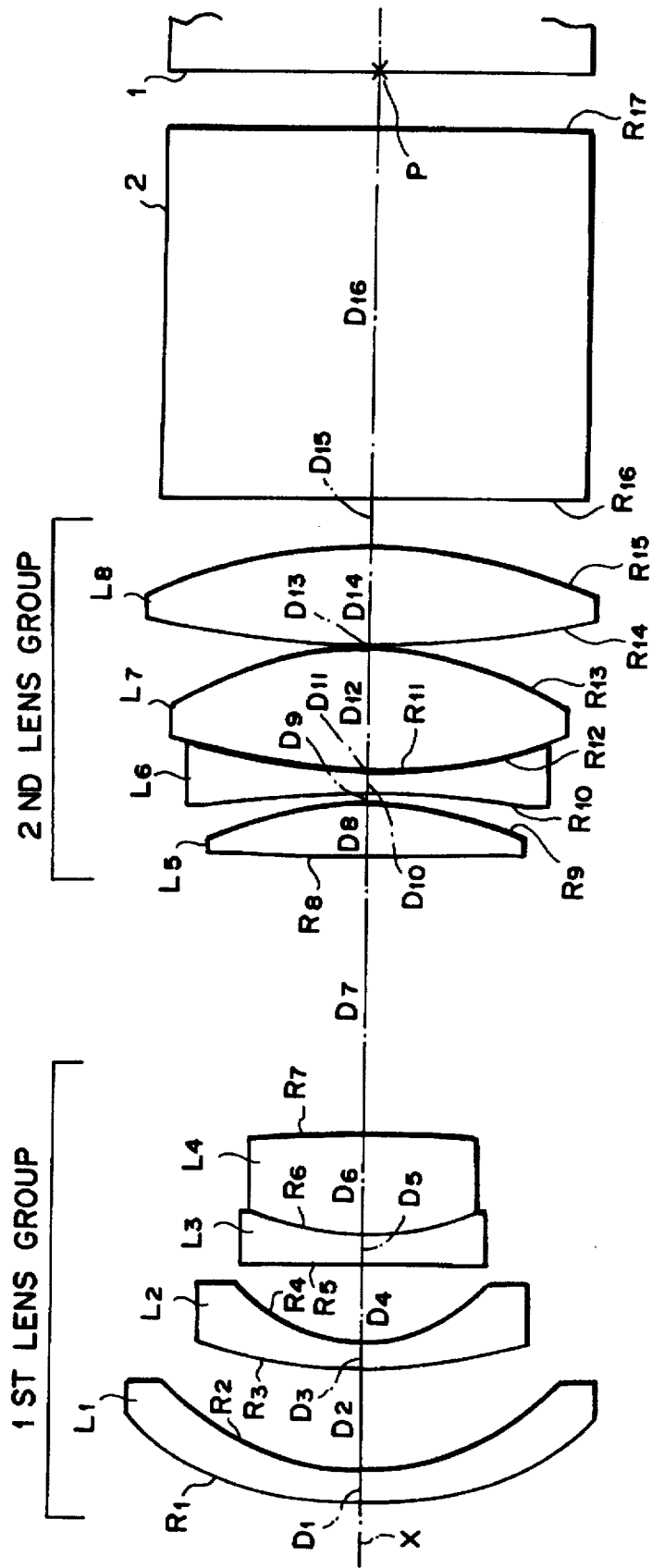
FIG. 4 is a schematic view showing a basic lens configuration in accordance with Embodiment 4 of the present invention.

The retrofocus lens of Embodiment 4 will be explained with reference to FIG. 4.

The lens of this embodiment has a lens configuration which is substantially the same as that of the lens of the above-mentioned Embodiment 3 but mainly differs therefrom in that the third lens $L_3$ is a biconcave lens whose surface with a stronger curvature is directed onto the reduction side, that the fifth lens $L_5$ is a biconvex lens whose surface with a stronger curvature is directed onto the reduction side, and that the sixth lens $L_6$ is a biconcave lens whose surface with a stronger curvature is directed onto the reduction side.

Here, all the above-mentioned conditional expressions (1) to (7) are satisfied, while individual values are set as shown in Table 8.

Table 4 (follows) shows radius of curvature R (mm) of each lens surface, center thickness of each lens and air gap between neighboring lenses D (mm), and refractive index N and Abbe number ν of each lens at d-line in this embodiment. The lower part of Table 4 shows the aspherical coefficients A, B, C, and D and eccentricity K of each of the first, second, eighth, and ninth surfaces.

The F number and half field angle ω of the lens in this embodiment are 2.53 and 41.7°, respectively.

Embodiment 5

Figure 5:
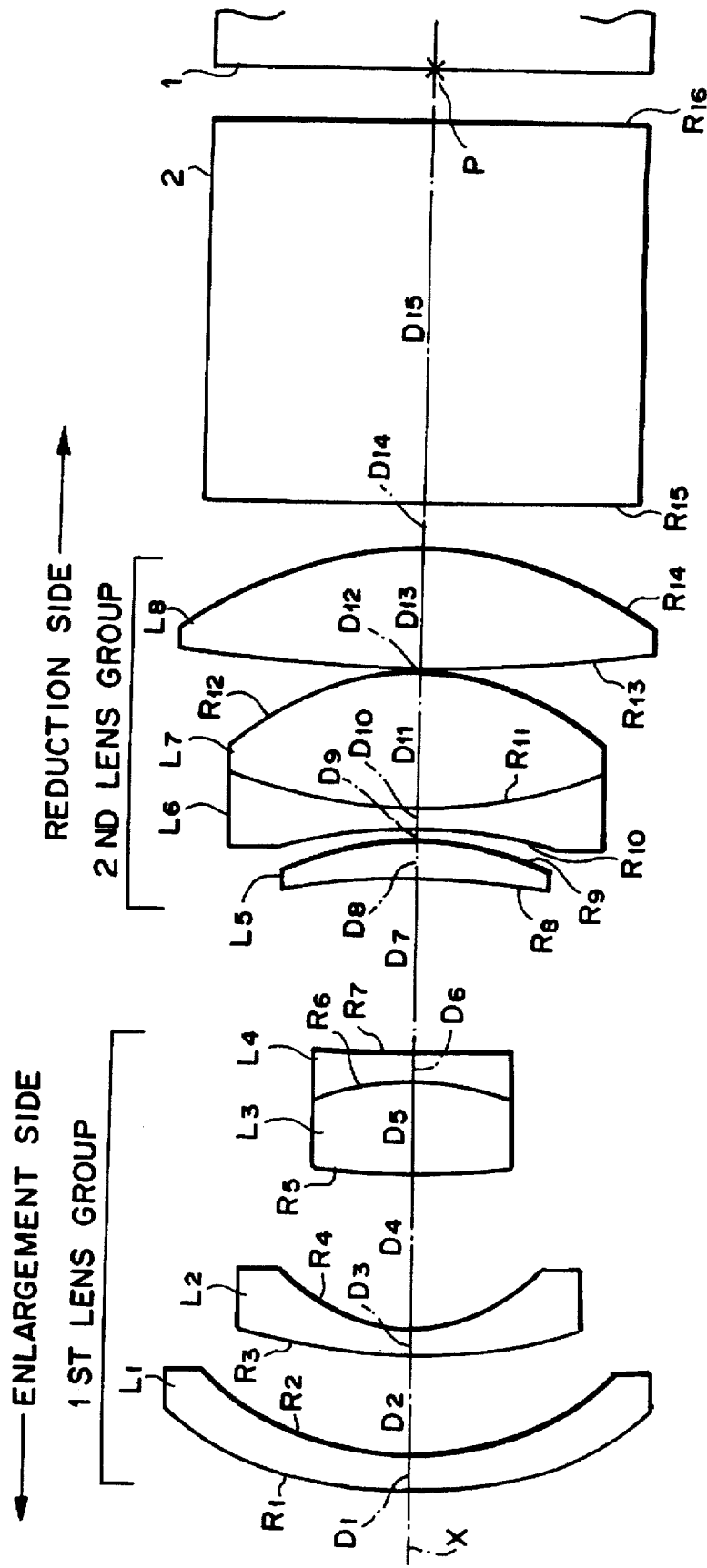
FIG. 5 is a schematic view showing a basic lens configuration in accordance with Embodiment 5 of the present invention.

The retrofocus lens of Embodiment 5 will be explained with reference to FIG. 5.

The lens of this embodiment has an eight-lens configuration which is substantially the same as that of the lens of the above-mentioned Embodiment 1 but mainly differs therefrom in that the third lens $L_3$ is a biconvex lens whose surface with a stronger curvature is directed onto the reduction side and that the fourth lens $L_4$ is a biconcave lens whose surface with a stronger curvature is directed onto the enlargement side.

The lens of this embodiment is configured so as to satisfy the following conditional expressions (8) to (14):

$$-2.5 < F_1/F_5 < -0.3 \quad (8)$$

$$-2.8 < FG_1/FG_2 < -1.0 \quad (9)$$

$$0.2 < H/FG_2 < 0.75 \quad (10)$$

$$0.0 < A(1) \quad (11)$$

$$0.0 < A(2) \quad (12)$$

$$28 < \nu_4 < 55 \quad (13)$$

$$58 < \nu_7 \quad (14)$$

wherein:

$F_1$ is the focal length of the first lens, $F_5$ is the focal length of the fifth lens, $FG_1$ is the focal length of the first lens group, $FG_2$ is the focal length of the second lens group, H is the principal point length of the second lens group on the enlargement side, A(1) is the aspheric surface coefficient of the fourth order term for the surface of the first lens on the enlargement side, A(2) is the aspheric surface coefficient of the fourth order term for the surface of the first lens on the reduction side, $\nu_4$ is the Abbe number of the fourth lens, and $\nu_7$ is the Abbe number of the seventh lens.

These conditional expressions (8) to (14) are defined according to the reasons explained in the following.

Namely, beyond the upper limit or below the lower limit of conditional expression (8), the two plastic lenses of the first lens $L_1$ and the fifth lens $L_5$ lose their balance in power, thereby increasing change in focal position and deterioration in imaging property due to changes in temperature.

Beyond the upper limit of conditional expression (9), the power of the first lens group increases so much that the ray height in the second lens group becomes too much, thereby making it difficult to correct aberration. Below the lower limit, on the other hand, the power of the first lens group is so weak that the distance from the lens surface on the reduction side to the focal position may become short or the diameter of the lens on the enlargement side in the first lens group may become large.

Conditional expression (10) keeps the reduction side of the system a telecentric configuration, while correcting various kinds of aberration. Beyond the upper limit or below the lower limit thereof, it becomes difficult to correct aberration.

Below the lower limits of conditional expressions (11) and (12), it becomes difficult to correct distortion.

Beyond the upper limit or below the lower limit of conditional expression (13), it becomes difficult to correct chromatic aberration in magnification and axial chromatic aberration with a favorable balance therebetween.

Below the lower limit of conditional expression (14), correction of chromatic aberration in magnification becomes insufficient.

Here, all the above-mentioned conditional expressions (8) to (14) are satisfied, while individual values are set as shown in Table 8.

Table 5 (follows) shows radius of curvature R (mm) of each lens surface, center thickness of each lens and air gap between neighboring lenses D (mm), and refractive index N and Abbe number ν of each lens at d-line in this embodiment. The lower part of Table 5 shows the aspherical coefficients A, B, C, and D and eccentricity K of each of the first, second, eighth, and ninth surfaces.

The F number and half field angle ω of the lens in this embodiment are 2.53 and 41.6°, respectively.

Embodiment 6

Figure 6:
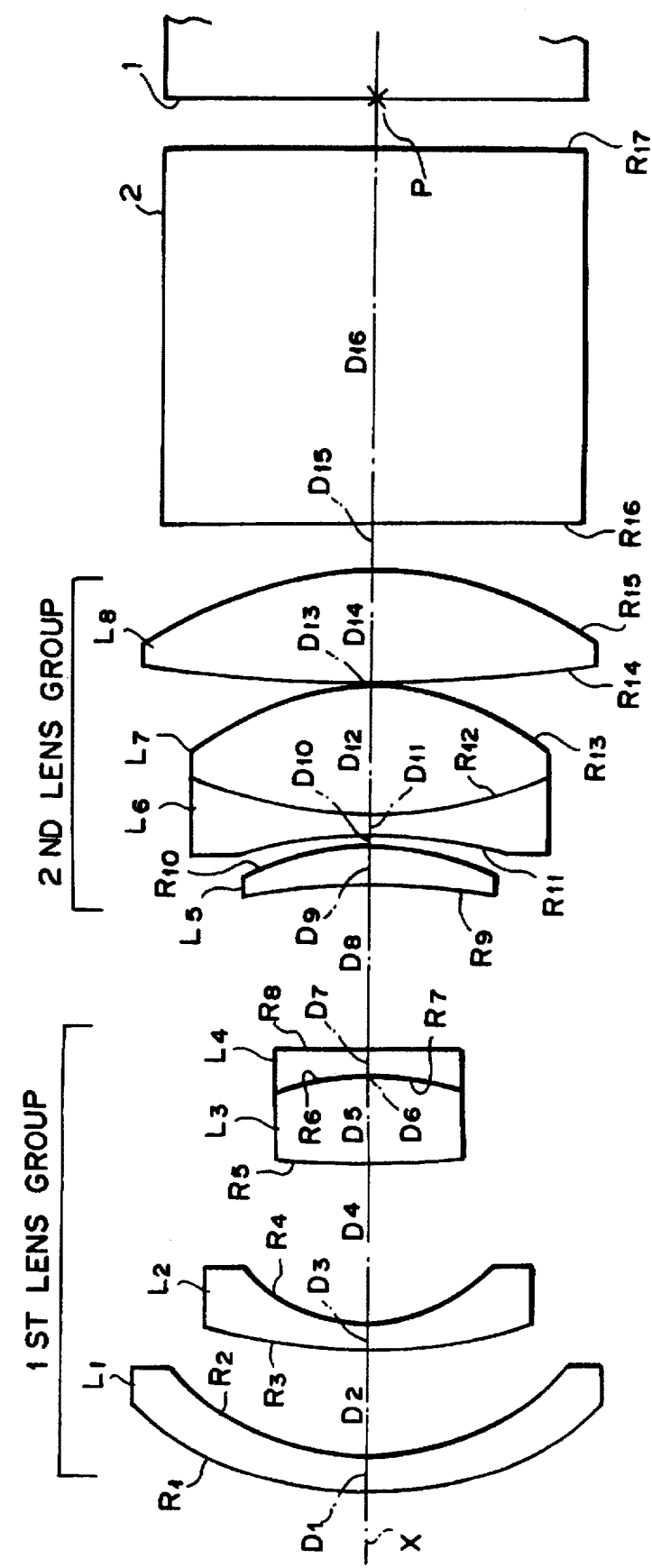
FIG. 6 is a schematic view showing a basic lens configuration in accordance with Embodiment 6 of the present invention.

The retrofocus lens of Embodiment 6 will be explained with reference to FIG. 6.

The lens of this embodiment has a lens configuration which is substantially the same as that of the lens of the above-mentioned Embodiment 5 but mainly differs therefrom in that the third lens $L_3$ and the fourth lens $L_4$ are separated from each other.

Here, all the above-mentioned conditional expressions (8) to (14) are satisfied, while individual values are set as shown in Table 8.

Table 6 (follows) shows radius of curvature R (mm) of each lens surface, center thickness of each lens and air gap between neighboring lenses D (mm), and refractive index N and Abbe number ν of each lens at d-line in this embodiment. The lower part of Table 6 shows the aspherical coefficients A, B, C, and D and eccentricity K of each of the first, second, eighth, and ninth surfaces.

The F number and half field angle ω of the lens in this embodiment are 2.53 and 41.6°, respectively.

Embodiment 7

Figure 7:
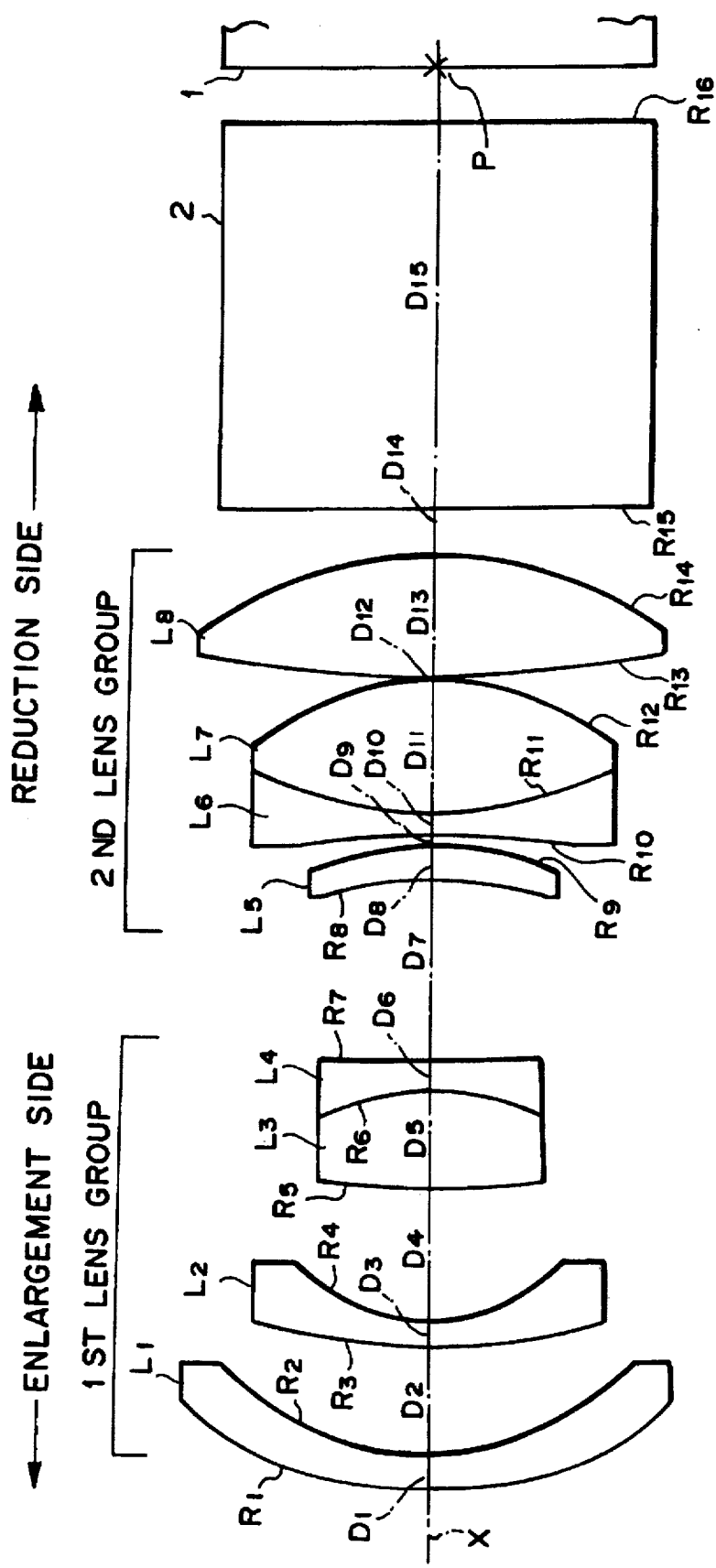
FIG. 7 is a schematic view showing a basic lens configuration in accordance with Embodiment 7 of the present invention.
Figures 11A, 11B, 11C, 11D:
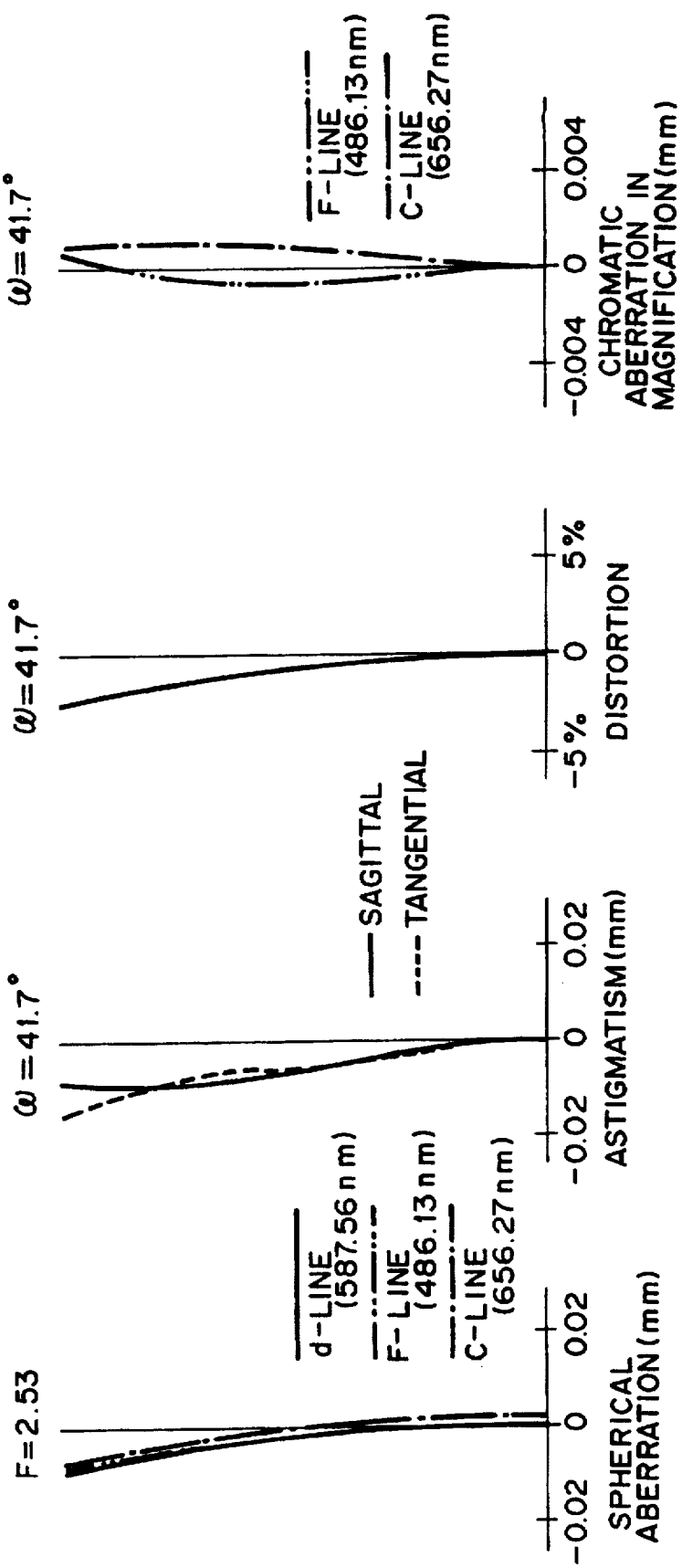
FIG. 11A shows a spherical aberration chart of the lens in accordance with embodiment 4.
FIG. 11B shows an astigmatism abberation chart of the lens in accordance with embodiment 4.
FIG. 11C shows a abberation chart of the lens in accordance with embodiment 4.
FIG. 11D shows a chromatic abberation in magnification chart of the lens in accordance with embodiment 4.

The retrofocus lens of Embodiment 7 will be explained with reference to FIG. 7.

The lens of this embodiment has a lens configuration which is substantially the same as that of the lens of the above-mentioned Embodiment 5.

Here, all the above-mentioned conditional expressions (8) to (14) are satisfied, while individual values are set as shown in Table 8.

Table 7 (follows) shows radius of curvature R (mm) of each lens surface, center thickness of each lens and air gap between neighboring lenses D (mm), and refractive index N and Abbe number ν of each lens at d-line in this embodiment. The lower part of Table 7 shows the aspherical coefficients A, B, C, and D and eccentricity K of each of the first, second, eighth, and ninth surfaces.

The F number and half field angle ω of the lens in this embodiment are 2.53 and 41.5°, respectively.

FIGS. 8 to 14 show aberration charts (aberration charts for spherical aberration, astigmatism, and chromatic aberration in magnification) corresponding to the above-mentioned Embodiments 1 to 7. In these aberration charts, ω indicates a half field angle. As can be seen from FIGS. 8 to 14, all the above-mentioned kinds of aberration can be made favorable in accordance with the foregoing embodiments.

Each chart for spherical aberration shows aberrations with respect to d-line, F-line, and C-line; while each chart for chromatic aberration in magnification shows aberrations of F-line and C-line with respect to d-line. Further, each chart for astigmatism shows aberrations with respect to sagittal (S) image surface and tangential (T) image surface.

Without being restricted to the above-mentioned embodiments, the retrofocus type lens of the present invention can be modified in various manners. For example, the curvature R of each lens and lens spacing (or lens thickness) D can be appropriately changed.

Though the lens of the present invention is used as an imaging lens in the foregoing embodiments, the mode of use of the retrofocus type lens in accordance with the present invention is not restricted thereto. For example, a similar effect can be obtained when it is used as a projection lens of a projector type television or the like.

As explained in detail in the foregoing, in accordance with the retrofocus type lens of the present invention, the lens surface of a predetermined lens is formed as an aspheric surface, while this lens is made of a plastic, whereby the correction of aberration such as distortion is made favorable and influence caused by changes in the plastic lens upon temperature can be suppressed.

Also, the reduction side can be formed as a telecentric system, thereby suppressing the decrease in the peripheral light quantity which may become problematic, in particular, in the projection lens of a projector type television using a liquid crystal display panel or the like.

TABLE 1

|   | R | D | N | ν |
|---|---|---|---|---|
| 1 | 3.6403 | 0.1770 | 1.4910 | 57.6 |
| 2 | 1.7102 | 0.5278 | | |
| 3 | 2.8106 | 0.1415 | 1.7015 | 41.2 |
| 4 | 0.8980 | 0.5897 | | |
| 5 | 13.3487 | 0.1522 | 1.7015 | 41.2 |
| 6 | 1.0944 | 0.5629 | 1.8467 | 23.9 |
| 7 | −14.6965 | 1.0620 | | |
| 8 | −2.3025 | 0.1617 | 1.4910 | 57.6 |
| 9 | −1.6797 | 0.0505 | | |
| 10 | −5.3445 | 0.1112 | 1.8467 | 23.9 |
| 11 | 2.2489 | 0.6962 | 1.4875 | 70.2 |
| 12 | −1.4544 | 0.0101 | | |
| 13 | 7.1353 | 0.6488 | 1.6204 | 60.3 |
| 14 | −1.9649 | 0.3000 | | |
| 15 | ∞ | 2.0724 | 1.5163 | 64.1 |
| 16 | ∞ | | | |

|   | K | A | B | C | D |
|---|---|---|---|---|---|
| 1 | 1.0000 | $0.7896 \times 10^{-1}$ | $-0.9712 \times 10^{-2}$ | $0.3396 \times 10^{-2}$ | $0.2617 \times 10^{-3}$ |
| 2 | 1.0000 | $0.4584 \times 10^{-1}$ | $0.1162 \times 10^{-1}$ | $-0.4963 \times 10^{-2}$ | $-0.4959 \times 10^{-2}$ |
| 8 | 1.0000 | $-0.6154 \times 10^{-1}$ | $0.1518 \times 10^{-2}$ | $-0.1567 \times 10^{-3}$ | $-0.1165 \times 10^{-2}$ |
| 9 | 1.0000 | $0.8329 \times 10^{-1}$ | $0.1555 \times 10^{-2}$ | $-0.9957 \times 10^{-3}$ | $-0.1199 \times 10^{-2}$ |

TABLE 2

|   | R | D | N | ν |
|---|---|---|---|---|
| 1 | 3.7560 | 0.1770 | 1.4910 | 57.6 |
| 2 | 1.8225 | 0.5359 | | |
| 3 | 3.2091 | 0.1416 | 1.7015 | 41.2 |
| 4 | 0.9876 | 0.7469 | | |
| 5 | 6.2706 | 0.1517 | 1.6385 | 55.4 |
| 6 | 1.4232 | 0.1012 | | |
| 7 | 1.6504 | 0.4801 | 1.8052 | 25.4 |
| 8 | −11.1014 | 0.9478 | | |
| 9 | −3.5320 | 0.2752 | 1.4910 | 57.6 |

TABLE 2-continued

| | | | | |
|---|---|---|---|---|
| 10 | −1.6833 | 0.0506 | | |
| 11 | −3.2261 | 0.1112 | 1.8467 | 23.9 |
| 12 | 2.1954 | 0.6073 | 1.4875 | 70.2 |
| 13 | −1.5387 | 0.0101 | | |
| 14 | 6.4769 | 0.5763 | 1.6204 | 60.3 |
| 15 | −1.8901 | 0.3000 | | |
| 16 | ∞ | 2.0724 | 1.5163 | 64.1 |
| 17 | ∞ | | | |

| | K | A | B | C | D |
|---|---|---|---|---|---|
| 1 | 1.0000 | $0.7797 \times 10^{-1}$ | $-0.7981 \times 10^{-2}$ | $0.2551 \times 10^{-2}$ | $-0.1519 \times 10^{-3}$ |
| 2 | 1.0000 | $0.5411 \times 10^{-1}$ | $0.1086 \times 10^{-1}$ | $-0.5168 \times 10^{-2}$ | $-0.5072 \times 10^{-2}$ |
| 9 | 1.0000 | $-0.5983 \times 10^{-1}$ | $0.5308 \times 10^{-3}$ | $-0.2428 \times 10^{-3}$ | $-0.1218 \times 10^{-2}$ |
| 10 | 1.0000 | $0.8124 \times 10^{-1}$ | $0.2803 \times 10^{-2}$ | $-0.9153 \times 10^{-3}$ | $-0.1242 \times 10^{-2}$ |

TABLE 3

| | R | D | N | ν |
|---|---|---|---|---|
| 1 | 3.7353 | 0.1774 | 1.4910 | 57.6 |
| 2 | 1.7522 | 0.5348 | | |
| 3 | 3.0247 | 0.1419 | 1.6667 | 48.3 |
| 4 | 0.8910 | 0.4173 | | |
| 5 | 31.0582 | 0.1527 | 1.7205 | 34.7 |
| 6 | 1.1637 | 0.5820 | 1.8467 | 23.9 |
| 7 | −14.0661 | 1.2570 | | |
| 8 | −15.7604 | 0.3041 | 1.4910 | 57.6 |
| 9 | −1.4482 | 0.0507 | | |
| 10 | −2.6652 | 0.1115 | 1.8467 | 23.9 |
| 11 | 5.0103 | 0.0258 | | |
| 12 | 5.9343 | 0.6814 | 1.4875 | 70.2 |
| 13 | −1.4906 | 0.0101 | | |
| 14 | 10.2638 | 0.5688 | 1.6204 | 60.3 |
| 15 | −2.2813 | 0.3000 | | |
| 16 | ∞ | 2.0724 | 1.5163 | 64.1 |
| 17 | ∞ | | | |

| | K | A | B | C | D |
|---|---|---|---|---|---|
| 1 | 1.0000 | $0.7884 \times 10^{-1}$ | $-0.9246 \times 10^{-2}$ | $0.3100 \times 10^{-2}$ | $0.1899 \times 10^{-3}$ |
| 2 | 1.0000 | $0.4756 \times 10^{-1}$ | $0.1118 \times 10^{-1}$ | $-0.5025 \times 10^{-2}$ | $-0.4930 \times 10^{-2}$ |
| 9 | 1.0000 | $-0.5947 \times 10^{-1}$ | $0.6514 \times 10^{-3}$ | $-0.3071 \times 10^{-3}$ | $-0.1180 \times 10^{-2}$ |
| 10 | 1.0000 | $0.8219 \times 10^{-1}$ | $0.2566 \times 10^{-2}$ | $-0.7778 \times 10^{-3}$ | $-0.1166 \times 10^{-2}$ |

TABLE 4

| | R | D | N | ν |
|---|---|---|---|---|
| 1 | 3.3128 | 0.1782 | 1.4910 | 57.6 |
| 2 | 1.6169 | 0.5663 | | |
| 3 | 2.9762 | 0.1425 | 1.6667 | 48.3 |
| 4 | 0.8986 | 0.4376 | | |
| 5 | −23.0277 | 0.1532 | 1.7205 | 34.7 |
| 6 | 1.5596 | 0.5539 | 1.8467 | 23.9 |
| 7 | −7.2509 | 1.5328 | | |
| 8 | 23.3717 | 0.3054 | 1.4910 | 57.6 |
| 9 | −1.8527 | 0.0509 | | |
| 10 | −5.7049 | 0.1120 | 1.8467 | 23.9 |
| 11 | 3.1907 | 0.0171 | | |
| 12 | 3.4089 | 0.6701 | 1.4875 | 70.2 |
| 13 | −1.9736 | 0.0102 | | |
| 14 | 5.6526 | 0.5333 | 1.6204 | 60.3 |
| 15 | −3.0301 | 0.3000 | | |
| 16 | ∞ | 2.0724 | 1.5163 | 64.1 |
| 17 | ∞ | | | |

TABLE 4-continued

| | K | A | B | C | D |
|---|---|---|---|---|---|
| 1 | 1.0000 | 0.7863×10⁻¹ | −0.1059×10⁻¹ | 0.3352×10⁻² | 0.5455×10⁻³ |
| 2 | 1.0000 | 0.4625×10⁻¹ | 0.1116×10⁻¹ | −0.5199×10⁻² | −0.5030×10⁻² |
| 8 | 1.0000 | −0.2043×10⁻¹ | 0.3476×10⁻² | 0.5165×10⁻³ | −0.7465×10⁻⁴ |
| 9 | 1.0000 | 0.3654×10⁻¹ | −0.2504×10⁻² | −0.6037×10⁻³ | −0.2028×10⁻³ |

TABLE 5

| | R | D | N | ν |
|---|---|---|---|---|
| 1 | 3.6333 | 0.1776 | 1.4910 | 57.6 |
| 2 | 1.7461 | 0.5408 | | |
| 3 | 3.0271 | 0.1421 | 1.6584 | 50.9 |
| 4 | 0.8925 | 0.8193 | | |
| 5 | 4.6854 | 0.5037 | 1.8467 | 23.9 |
| 6 | −1.4188 | 0.1527 | 1.7234 | 38.0 |
| 7 | 13.5067 | 0.9458 | | |
| 8 | −5.2799 | 0.2172 | 1.4910 | 57.6 |
| 9 | −1.4198 | 0.0511 | | |
| 10 | −2.8135 | 0.1119 | 1.8467 | 23.9 |
| 11 | 2.5544 | 0.7217 | 1.4875 | 70.2 |
| 12 | −1.5086 | 0.0102 | | |
| 13 | 8.0709 | 0.6548 | 1.6204 | 60.3 |
| 14 | −2.0473 | 0.3000 | | |
| 15 | ∞ | 2.0724 | 1.5163 | 64.1 |
| 16 | ∞ | | | |

| | K | A | B | C | D |
|---|---|---|---|---|---|
| 1 | 1.0000 | 0.7874 ×10⁻¹ | −0.8802×10⁻² | 0.2835×10⁻² | 0.1097×10⁻³ |
| 2 | 1.0000 | 0.5069 ×10⁻¹ | 0.1106×10⁻¹ | −0.5143×10⁻² | −0.4986×10⁻² |
| 8 | 1.0000 | −0.6231 ×10⁻¹ | 0.1033×10⁻² | −0.1516×10⁻³ | −0.1173×10⁻² |
| 9 | 1.0000 | 0.8155−×10⁻¹ | 0.2384×10⁻² | −0.9927×10⁻³ | −0.1218×10⁻² |

TABLE 6

| | R | D | N | ν |
|---|---|---|---|---|
| 1 | 3.1676 | 0.1776 | 1.4910 | 57.6 |
| 2 | 1.6155 | 0.5773 | | |
| 3 | 3.0673 | 0.1421 | 1.6584 | 50.9 |
| 4 | 0.8942 | 0.8885 | | |
| 5 | 4.8498 | 0.4934 | 1.8467 | 23.9 |
| 6 | −1.5527 | 0.0101 | | |
| 7 | −1.5618 | 0.1522 | 1.7234 | 38.0 |
| 8 | 25.0867 | 0.8923 | | |
| 9 | −4.7638 | 0.2110 | 1.4910 | 57.6 |
| 10 | −1.4327 | 0.0507 | | |
| 11 | −2.7807 | 0.1116 | 1.8467 | 23.9 |
| 12 | 2.4360 | 0.7034 | 1.4875 | 70.2 |
| 13 | −1.5183 | 0.0102 | | |
| 14 | 7.7722 | 0.6479 | 1.6204 | 60.3 |
| 15 | −2.0092 | 0.3000 | | |
| 16 | ∞ | 2.0724 | 1.5163 | 64.1 |
| 17 | ∞ | | | |

| | K | A | B | C | D |
|---|---|---|---|---|---|
| 1 | 1.0000 | 0.7756×10⁻¹ | −0.8160×10⁻² | 0.3012×10⁻² | 0.9021×10⁻⁴ |
| 2 | 1.0000 | 0.5268×10⁻¹ | 0.1110×10⁻¹ | −0.5160×10⁻² | −0.5014×10⁻² |
| 9 | 1.0000 | −0.6232×10⁻¹ | 0.9885×10⁻³ | −0.1591×10⁻³ | −0.1204×10⁻² |
| 10 | 1.0000 | 0.8144×10⁻¹ | 0.2464×10⁻² | −0.1000×10⁻² | −0.1250×10⁻² |

TABLE 7

| | R | D | N | ν |
|---|---|---|---|---|
| 1 | 3.3969 | 0.1771 | 1.4910 | 57.6 |
| 2 | 1.6556 | 0.5610 | | |
| 3 | 3.2256 | 0.1414 | 1.6700 | 47.3 |
| 4 | 0.9102 | 0.7181 | | |
| 5 | 4.2475 | 0.5347 | 1.8467 | 23.9 |
| 6 | −1.2256 | 0.1521 | 1.7234 | 38.0 |
| 7 | 16.4249 | 0.9450 | | |
| 8 | −1.9963 | 0.1895 | 1.4910 | 57.6 |
| 9 | −1.4260 | 0.0506 | | |
| 10 | −4.5689 | 0.1114 | 1.8467 | 23.9 |
| 11 | 2.1266 | 0.7090 | 1.4875 | 70.2 |
| 12 | −1.4243 | 0.0101 | | |
| 13 | 6.2610 | 0.6713 | 1.5891 | 61.2 |
| 14 | −1.9435 | 0.3000 | | |
| 15 | ∞ | 2.0724 | 1.5163 | 64.1 |
| 16 | ∞ | | | |

| | K | A | B | C | D |
|---|---|---|---|---|---|
| 1 | 1.0000 | $0.7988 \times 10^{-1}$ | $-0.9591 \times 10^{-2}$ | $0.2912 \times 10^{-2}$ | $0.6819 \times 10^{-4}$ |
| 2 | 1.0000 | $0.5205 \times 10^{-1}$ | $0.1148 \times 10^{-1}$ | $-0.5489 \times 10^{-2}$ | $-0.5497 \times 10^{-2}$ |
| 8 | 1.0000 | $-0.6388 \times 10^{-1}$ | $0.1245 \times 10^{-2}$ | $-0.1762 \times 10^{-3}$ | $-0.1444 \times 10^{-2}$ |
| 9 | 1.0000 | $0.8392 \times 10^{-1}$ | $0.2201 \times 10^{-2}$ | $-0.1144 \times 10^{-2}$ | $-0.1502 \times 10^{-2}$ |

TABLE 8

| | Embod. 1 | Embod. 2 | Embod. 3 | Embod. 4 |
|---|---|---|---|---|
| (1) | −0.58 | −1.19 | −2.15 | −1.90 |
| (2) | −1.74 | −2.30 | −1.34 | −1.24 |
| (3) | 0.58 | 0.57 | 0.57 | 0.48 |
| (4) | $0.79 \times 10^{-1}$ | $0.78 \times 10^{-1}$ | $0.79 \times 10^{-1}$ | $0.79 \times 10^{-1}$ |
| (5) | $0.46 \times 10^{-1}$ | $0.54 \times 10^{-1}$ | $0.48 \times 10^{-1}$ | $0.46 \times 10^{-1}$ |
| (6) | 23.9 | 25.4 | 23.9 | 23.9 |
| (7) | 70.2 | 70.2 | 70.2 | 70.2 |

| | Embod. 5 | Embod. 6 | Embod. 7 |
|---|---|---|---|
| (8) | −1.82 | −1.71 | −0.74 |
| (9) | −1.65 | −1.82 | −1.92 |
| (10) | 0.59 | 0.58 | 0.60 |
| (11) | $0.79 \times 10^{-1}$ | $0.78 \times 10^{-1}$ | $0.80 \times 10^{-1}$ |
| (12) | $0.51 \times 10^{-1}$ | $0.53 \times 10^{-1}$ | $0.52 \times 10^{-1}$ |
| (13) | 38.0 | 38.0 | 38.0 |
| (14) | 70.2 | 70.2 | 70.2 |

What is claimed is:

1. A retrofocus type lens comprising, successively from an enlargement side, a first lens group which is negative as a whole and a second lens group which is positive as a whole;

wherein said first lens group comprises, successively from the enlargement side, a negative first lens made of a plastic having a concave surface directed onto a reduction side and an aspheric surface, a negative second lens having a concave surface directed onto the reduction side, a negative third lens, and a positive fourth lens;

wherein said second lens group comprises, successively from the enlargement side, a positive fifth lens made of a plastic having a convex surface directed onto the reduction side and an aspheric surface, a negative sixth lens, a positive seventh lens having a convex surface directed onto the reduction side, and a positive eighth lens having a convex surface directed onto the reduction side; and wherein said retrofocus type lens is configured so as to satisfy the following conditional expressions (1) to (7):

$$-2.5 < F_1/F_5 < -0.3 \quad (1)$$

$$-2.8 < FG_1/FG_2 < -1.0 \quad (2)$$

$$0.2H/FG_2 < 0.75 \quad (3)$$

$$0.0 < A(1) \quad (4)$$

$$0.0 < A(2) \quad (5)$$

$$\nu_4 < 32 \quad (6)$$

$$58 < \nu_7 \quad (7)$$

wherein:

$F_1$ is focal length of the first lens, $F_5$ is focal length of the fifth lens, $FG_1$ is focal length of the first lens group, $FG_2$ is focal length of the second lens group, H is principal point length of the second lens group on the enlargement side, A(1) is aspheric surface coefficient of fourth order term for the surface of the first lens on the enlargement side, A(2) is aspheric surface coefficient of fourth order term for the surface of the first lens on the reduction side, $\nu_4$ is Abbe number of the fourth lens, and $\nu_7$ is Abbe number of the seventh lens.

2. A retrofocus lens comprising, successively from an enlargement side, a first lens group which is negative as a whole and a second lens group which is positive as a whole;

wherein said first lens group comprises, successively from the enlargement side, a negative first lens made of a plastic having a concave surface directed onto a reduction side and an aspheric surface, a negative second lens having a concave surface directed onto the reduction side, a positive third lens, and a negative fourth lens;

wherein said second lens group comprises, successively from the enlargement side, a positive fifth lens made of a plastic having a convex surface directed onto the reduction side and an aspheric surface, a negative sixth lens, a positive seventh lens having a convex surface directed onto the reduction side, and a positive eighth lens having a convex surface directed onto the reduction side; and wherein said retrofocus type lens is configured so as to satisfy the following conditional expressions (8) to (14):

$$-2.5 < F_1/F_5 < -0.3 \qquad (8)$$

$$-2.8 < FG_1/FG_2 < -1.0 \qquad (9)$$

$$0.2 < H/FG_2 < 0.75 \qquad (10)$$

$$0.0 < A(1) \qquad (11)$$

$$0.0 < A(2) \qquad (12)$$

$$28 < v_4 < 55 \qquad (13)$$

$$58 < v_7 \qquad (14)$$

wherein:

$F_1$ is focal length of the first lens, $F_5$ is focal length of the fifth lens, $FG_1$ is focal length of the first lens group, $FG_2$ is focal length of the second lens group, H is principal point length of the second lens group on the enlargement side, A(1) is aspheric surface coefficient of the fourth order term for the surface of the first lens on the enlargement side, A(2) is aspheric surface coefficient of the fourth order term for the surface of the first lens on the reduction side, $v_4$ is Abbe number of the fourth lens, and $v_7$ is Abbe number of the seventh lens.

* * * * *